United States Patent
Booles

(10) Patent No.: US 6,889,538 B2
(45) Date of Patent: May 10, 2005

(54) MONITORING SYSTEM FOR LEAK PREVENTION AND DETECTION

(75) Inventor: Harold F. Booles, Little Rock, AR (US)

(73) Assignee: Varco I/P, Inc., Houston, TX (US)

( * ) Notice: Subject to any disclaimer, the term of this patent is extended or adjusted under 35 U.S.C. 154(b) by 0 days.

(21) Appl. No.: 10/676,033

(22) Filed: Oct. 2, 2003

(65) Prior Publication Data

US 2005/0072215 A1 Apr. 7, 2005

(51) Int. Cl.⁷ .................... G01M 3/04; G01M 3/08; F16L 35/00
(52) U.S. Cl. .................. 73/40.5 R; 73/49.1; 73/49.5; 285/93
(58) Field of Search ............ 73/40, 40.5 R, 73/49.1, 49.5; 48/193; 137/312; 138/114; 285/93

(56) References Cited

U.S. PATENT DOCUMENTS

| | | | |
|---|---|---|---|
| 3,299,417 A | * | 1/1967 | Sibthorpe .................. 340/605 |
| 4,673,652 A | * | 6/1987 | McStravick et al. ......... 436/2 |
| 4,971,477 A | | 11/1990 | Webb et al. |
| 5,072,622 A | * | 12/1991 | Roach et al. ............ 73/40.5 R |
| 5,297,896 A | | 3/1994 | Webb |
| 5,556,679 A | | 9/1996 | Booles |
| 5,831,149 A | * | 11/1998 | Webb ...................... 73/40.5 R |
| 5,884,657 A | * | 3/1999 | Srock ......................... 137/312 |
| 5,931,184 A | * | 8/1999 | Armenia et al. ............ 137/312 |
| 5,975,110 A | * | 11/1999 | Sharp ....................... 137/234.6 |
| 6,029,505 A | * | 2/2000 | Webb ...................... 73/40.5 R |
| 6,032,699 A | * | 3/2000 | Cochran et al. ............ 138/104 |
| 6,171,025 B1 | * | 1/2001 | Langner et al. .......... 405/154.1 |

FOREIGN PATENT DOCUMENTS

JP          57063433 A  *  4/1982  ............. 73/40.5 R

* cited by examiner

Primary Examiner—Michael Cygan
(74) Attorney, Agent, or Firm—Finnegan, Henderson, Farabow, Garrett & Dunner, LLP

(57) ABSTRACT

A monitoring system for leak prevention and leak detection in a pipe line through which a liquid, particularly a petroleum product, passes. The system includes a fitting having two ports. Both ports are connected to an interstitial area surrounding the pipe through which the liquid passes. One port is also connected to a liquid leakage detection device and the other port is connected to a device for preventing liquid leakage to the ambient area.

3 Claims, 4 Drawing Sheets

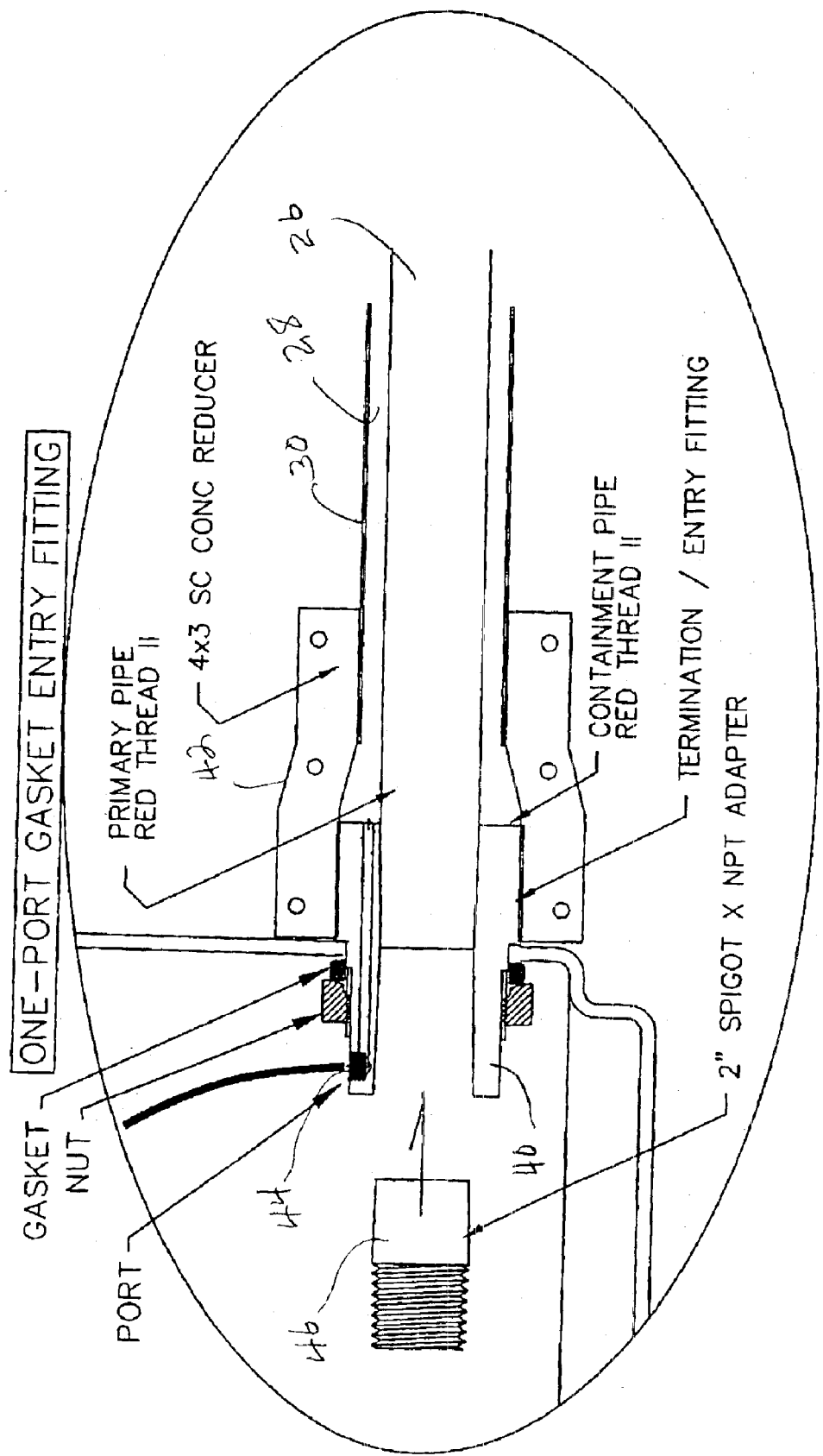

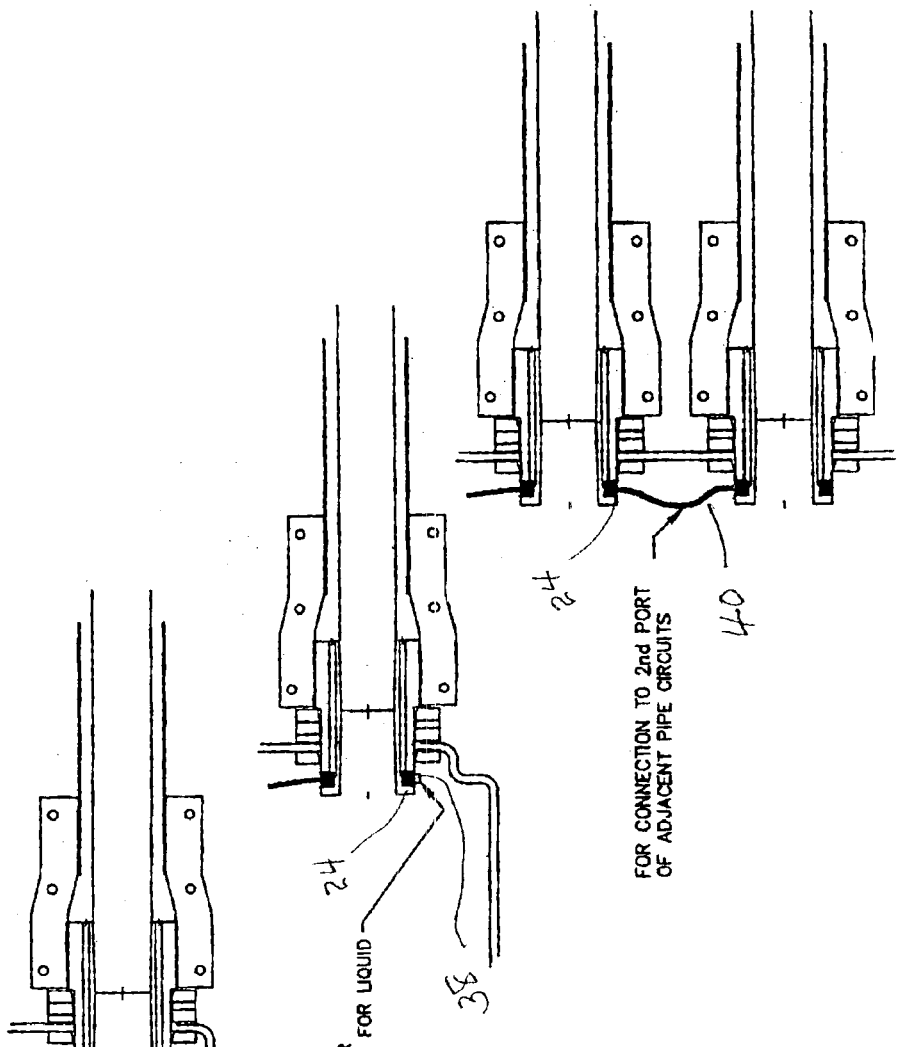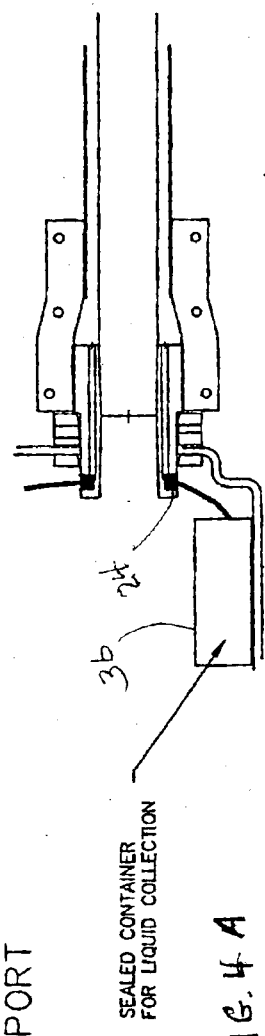

MONITORING SYSTEM FOR LEAK PREVENTION AND DETECTION

DESCRIPTION OF THE INVENTION

1. Field of the Invention

The invention relates to a monitoring system for use in a pipe line through which a liquid, particularly a petroleum product passes. The monitoring system is particularly adapted for leak detection and/or leak prevention in a pipe line.

2. Background of the Invention

In applications, such as a service station for motor vehicles, it is critical that provision be made for monitoring these systems, particularly for leak detection and/or leak prevention. Otherwise, the ambient area and environment may be polluted if leakage occurs.

In a conventional service station for motor vehicles, the petroleum product, commonly termed gasoline, is stored in an underground tank. The product is pumped through a pipe line to the above ground product dispenser, commonly termed a gasoline pump. The pipe line conventionally consists of two pipes with one contained within the other and being of relative cross sectional area so as to provide an interstitial space between the pipes along the pipe line. In the event of leakage of product flowing through the inner or primary pipe of lesser cross-sectional area, the leaking product will flow into the interstitial space rather than the ambient environment. This leaked product from the interstitial space is then diverted to a sump where it is maintained until removal thereof.

The interstitial space is monitored for leak detection. It is known to use various vacuum and/or hydrostatic systems for this purpose.

SUMMARY OF THE INVENTION

In accordance with the invention of the instant application, a system is provided for use in a pipe line that is characterized by the capability of both leak detection and/or leak prevention by the use of a fitting that permits both of these functions, as well as other monitoring functions.

Accordingly, there is provided a monitoring system for use in a pipe line adapted for leak prevention and/or leak detection in a pipe line constituting a first pipe through which a liquid passes positioned and contained within a second pipe having an inside diameter greater than the outside diameter of the first pipe to provide an annular through passage surrounding the first pipe. The system further includes a fitting connected to the second pipe. The fitting has a through passage in liquid connection with the first pipe. Further, the fitting has at least one port connected to the annular through passage via an annular passage surrounding the through passage of the fitting. The first port is connected to means for detecting liquid leakage from the first pipe. A second port may be provided and adapted for removal of liquid leakage from the annular through passage.

The monitoring system further includes means for detecting liquid leakage from the first pipe, including means for monitoring vacuum within the annular through passage and producing a signal indicating liquid leakage upon any vacuum reduction. The second port may be connected to a liquid container to prevent liquid leakage from entering the ambient environment.

The pipe line is connected at one end thereof to an underground liquid storage tank and at another end to an above ground liquid dispenser.

BRIEF DESCRIPTION OF THE DRAWINGS

The accompanying drawings, which are incorporated in and constitute a part of this specification, illustrate a preferred embodiment of the invention and, together with the description, serve to explain the objects, advantages, and principles of the invention.

FIG. 3 is a cross-sectional view of an alternate annular fitting constituting a component of the monitoring system; and.

FIGS. 4A, B and C constitute cross-sectional views of specific monitoring functions that may be performed using the fitting of FIG. 2.

DETAILED DESCRIPTION

Figure 1:
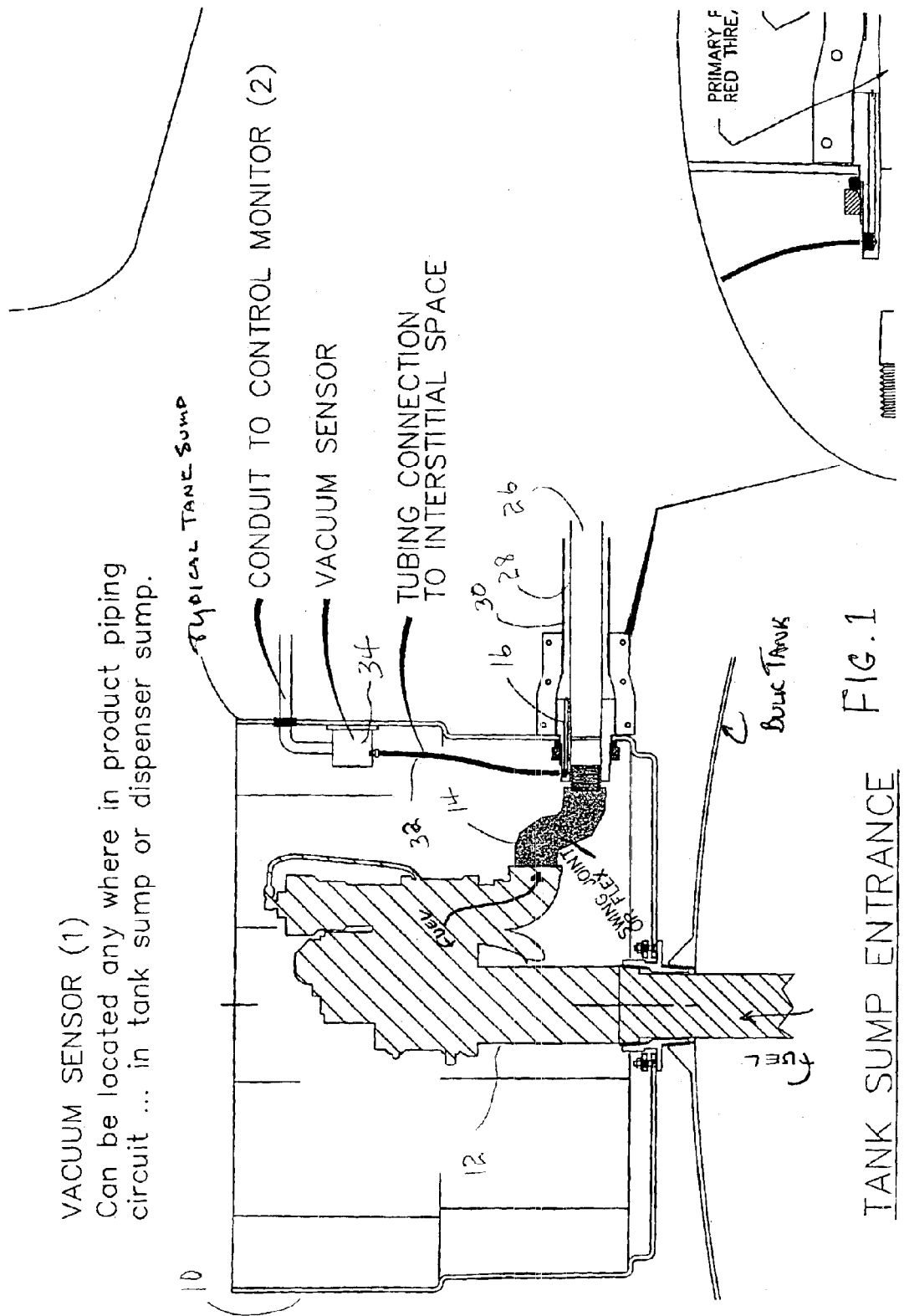
FIG. 1 is a somewhat schematic, cross-sectional view of one embodiment of a monitoring system for leak prevention and leak detection in a pipe line in accordance with the invention.

With reference to the drawings, and for the present to FIG. 1, there is shown a conventional system for delivering liquid, such as a petroleum product from an underground tank (not shown) to a liquid dispenser (not shown). In accordance with an embodiment of the invention, tank sump 10 has a pump 12 with a swing joint or flex connection 14 that is connected to fitting 16. The fitting 16, as shown in detail in FIG. 2, has a central through passage 18 and an annular passage 20 terminating at leak detection port 22 and leak prevention port 24.

Upon connection of the fitting 16 to the system, the passage 18 communicates with pipe 26 and the annular passage 20 communicates with the interstitial space 28 defined between pipe 26 and pipe 30.

The leak detection port 22 is connected through the annular passage 20 to the interstitial space 28 via tubing 32 to a vacuum sensor 34, which is in turn connected to a conduit extending to a control monitor (not shown).

The leak prevention port 24 may be connected to a sealed container 36, as shown in FIG. 4A, wherein liquid leaking into the interstitial passage 28 may be contained until removal.

The fitting 16 through the use of leak detection port 22 and leak prevention port 24, therein provide through the use of a single fitting both leak detection and leak prevention functions, thereby simplifying the monitoring system.

Alternately, as shown in FIG. 4B, port 24 may be closed by use of a removable plug 38 to permit periodic inspection for liquid leakage.

As another alternative, port 24 may be used as a connection to adjacent pipe line circuits by the use of a connecting pipe 40, as shown in FIG. 4C.

Figure 2:
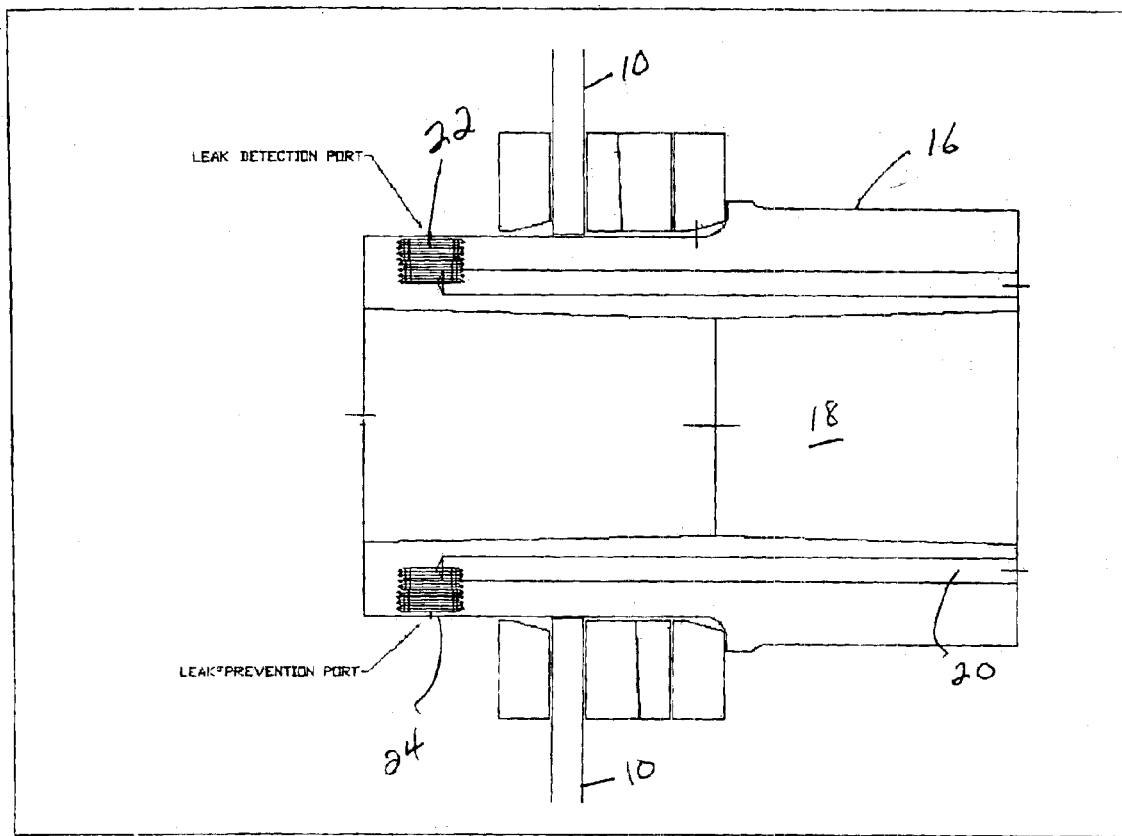
FIG. 2 is a cross-sectional view of an annular fitting constituting a component of the monitoring system.

An alternate annular fitting is shown in FIG. 3 and designated as 42. This fitting may be similar in all aspects to the fitting of FIG. 2, and differs only in having a single port 44. As with fitting 16 of FIG. 2, an adapter spigot 46 may be provided to facilitate connection of fitting 42 to a pump 12, as shown in FIG. 1. The maybe used to perform the same function as port 22, as shown in FIG. 2 and described herein above.

What is claimed is:

1. A monitoring system for leak prevention and leak detection in a pipe line constituting a first pipe through which a liquid passes positioned and contained within a second pipe having an inside diameter greater than an outside diameter of the first pipe to provide an annular through passage surrounding the first pipe, the system comprising:

a fitting connecting the first pipe to a liquid source;

said fitting having a through passage in liquid connection with said first pipe;

said fitting having a first port and a second port connected to said annular through passage via an annular passage surrounding said through passage of said fitting;

said first port being connected to means for detecting liquid leakage from said first pipe to said annular through passage surrounding said first pipe with said means for detecting liquid leakage including means for monitoring vacuum within said annular through passage and producing a signal indicating liquid leakage upon any vacuum reduction; and said second port being adapted for removal of liquid leakage from said annular through passage.

2. The monitoring system of claim 1, wherein said second port is connected to a liquid container to prevent liquid leakage from entering ambient environment.

3. The monitoring system of claim 2, wherein said fitting connects said first pipe at one end thereof to an underground liquid storage tank and another end of said first pipe is connected to an above ground liquid dispenser.

\* \* \* \* \*